United States Patent
Grebnev et al.

(10) Patent No.: US 11,954,282 B2
(45) Date of Patent: Apr. 9, 2024

(54) DETERMINING A DISTANCE TO AN INPUT DEVICE

(71) Applicant: Microsoft Technology Licensing, LLC, Redmond, WA (US)

(72) Inventors: Igor Grebnev, Redmond, WA (US); Jonathan Westhues, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/999,394

(22) PCT Filed: May 13, 2021

(86) PCT No.: PCT/US2021/070548
§ 371 (c)(1),
(2) Date: Nov. 19, 2022

(87) PCT Pub. No.: WO2021/248147
PCT Pub. Date: Dec. 9, 2021

(65) Prior Publication Data
US 2023/0236693 A1    Jul. 27, 2023

(30) Foreign Application Priority Data
Jun. 2, 2020  (NL)  ..................... 2025725

(51) Int. Cl.
*G06F 3/041*     (2006.01)
*G06F 3/044*     (2006.01)

(52) U.S. Cl.
CPC ...... *G06F 3/04162* (2019.05); *G06F 3/04146* (2019.05); *G06F 3/0442* (2019.05); *G06F 2203/04101* (2013.01)

(58) Field of Classification Search
CPC ............... G06F 3/04162; G06F 3/0442; G06F 3/04146; G06F 2203/04101
(Continued)

(56) References Cited

U.S. PATENT DOCUMENTS 10,282,039 B2    5/2019  Zhan et al.
2008/0106520 A1*  5/2008  Free ...................... G06F 3/0446
                                                                345/173

(Continued)

FOREIGN PATENT DOCUMENTS

KR     100590933 B1    6/2006
WO     2019113906 A1   6/2019

OTHER PUBLICATIONS

Annett, Michelle Kathryn, "The Fundamental Issues of Pen-Based Interaction with Tablet Devices", In Thesis of University of Alberta, 2014, 143 Pages.

(Continued)

*Primary Examiner* — Mark Edwards
(74) *Attorney, Agent, or Firm* — Alleman Hall & Tuttle LLP

(57) ABSTRACT

Examples are disclosed that relate to methods and computing devices for determining a distance of an input device from a surface of a computing device. In one example, a method comprises receiving a plurality of input device signals via the input device. A portion of the input device signals are used to determine an effective voltage of the input device. Adjusted input device signals are generated by adjusting another portion of input device signals using the effective voltage of the input device. The method further comprises providing the adjusted input device signals as an input to a distance model, and receiving and outputting the distance of the input device from the surface of the computing device.

18 Claims, 9 Drawing Sheets

(58) Field of Classification Search
USPC .......................................................... 345/179
See application file for complete search history.

(56) References Cited

U.S. PATENT DOCUMENTS

| | | |
|---|---|---|
| 2009/0207154 A1 | 8/2009 | Chino |
| 2014/0092069 A1 | 4/2014 | Bentov |
| 2015/0346875 A1 | 12/2015 | Yeh |
| 2017/0315631 A1 | 11/2017 | Pourbigharaz et al. |
| 2018/0032170 A1* | 2/2018 | Shaik ...................... G06F 3/017 |
| 2018/0039346 A1 | 2/2018 | Chang |
| 2018/0052534 A1* | 2/2018 | Ron ........................ G06T 11/60 |
| 2018/0173346 A1* | 6/2018 | Du ......................... H01L 27/124 |

OTHER PUBLICATIONS

"Search Report and Written Opinion Issued in Netherlands Patent Application No. N2025725", dated Mar. 24, 2021, 10 Pages.

"International Search Report and Written Opinion Issued in PCT Application No. PCT/US21/070548", dated Aug. 16, 2021, 13 Pages.

* cited by examiner

DETERMINING A DISTANCE TO AN INPUT DEVICE

CROSS REFERENCE TO RELATED APPLICATIONS

The present application is a U.S. National Phase of International Patent Application Serial No. PCT/US2021/070548, filed May 13, 2021, which claims priority to Netherlands Patent Application Serial No. 2025725, filed Jun. 2, 2020, the entire contents of each of which are hereby incorporated by reference for all purposes.

BACKGROUND

Some computing devices receive inputs from input devices and touch-sensitive surfaces. For example, a tablet computing device may need to use an input based on a distance between a tip of an electronic pen and a capacitive touch-screen surface. The computing device may be trained to determine the distance between the tip of the pen and the surface. However, training data collected with one input device may not accurately represent other input devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to methods and computing devices for determining a distance of an input device from a surface of a computing device. In one example, a method comprises receiving a plurality of input device signals via the input device. A portion of the input device signals are used to determine an effective voltage of the input device. Adjusted input device signals are calculated by adjusting another portion of input device signals using the effective voltage of the input device. The method further comprises providing the adjusted input device signals as an input to a to a distance model that is used to calculate the distance of the input device from the surface of the computing device.

DETAILED DESCRIPTION

Figure 1:
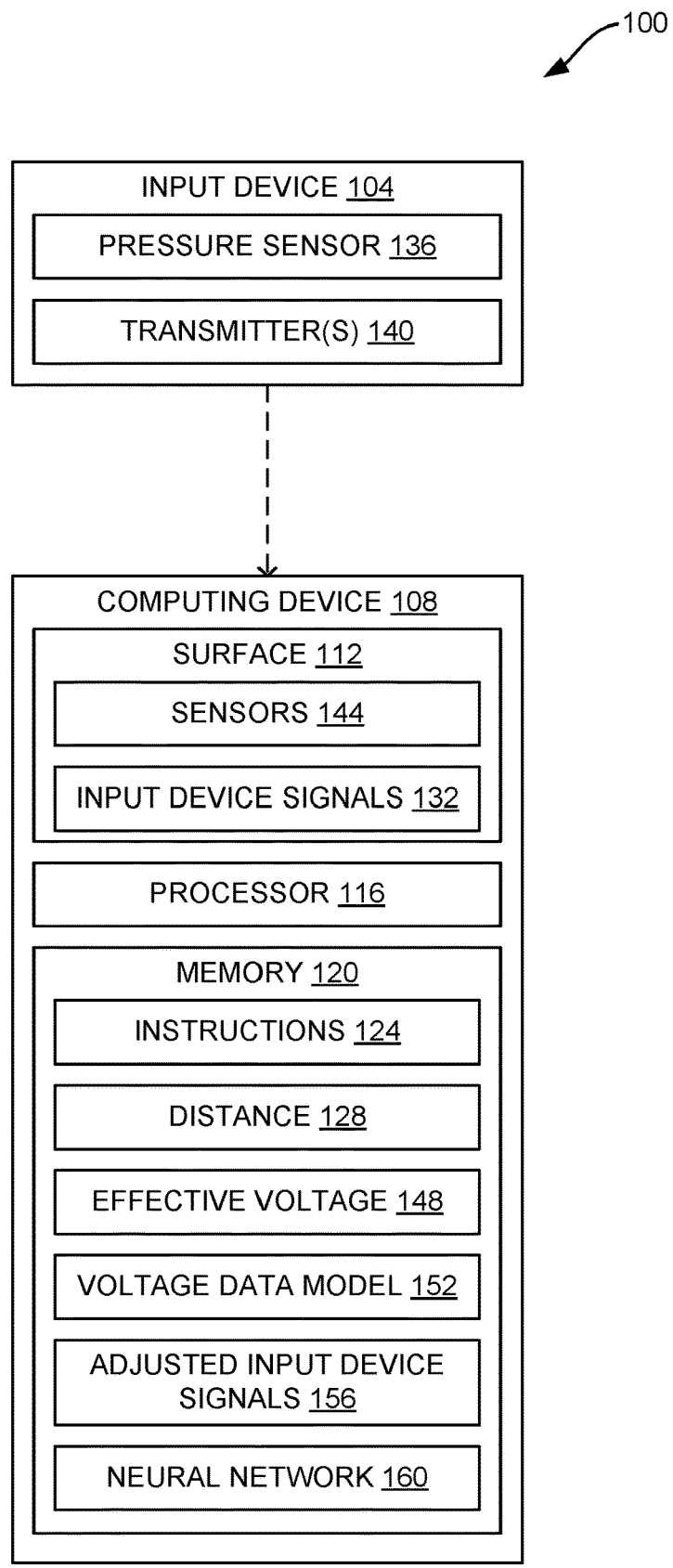
FIG. 1 shows a block diagram of an example system including an input device and a computing device according to examples of the present disclosure.

Some computing devices receive inputs from input devices and/or touch-sensitive surfaces. For example, a tablet computing device may need to use an input based on a distance between a tip of an electronic pen and a capacitive touch-screen surface. In some examples, electronic ink is displayed on the screen based on the distance between the pen tip and the screen. The ink may be displayed when the computing device determines that the pen tip is placed on the screen.

In some examples, the computing device may determine that an input device is placed on the screen when a pressure sensor of the input device is actuated. For example, an electronic pen may include a pressure sensor in its tip that is actuated when the tip is pressed against a surface. The pressure sensor may actuate when a threshold amount of force, such as 10 grams, is applied. However, some users may find it difficult to apply such force, which may contribute to an unintended lack of actuation and electronic ink, which is a less than satisfactory user experience.

In other examples, a computing device may determine a distance between an input device and a surface via capacitive sensing. For example, the computing device may use a distance data model, such as a neural network or other machine learning algorithm, to predict the distance between the input device and the surface from capacitive sensor data. However, machine learning training data collected with one input device may not accurately represent other input devices. For example, a voltage generated at a tip of an active electronic pen may vary based on the pen's power supply and/or other components. In some examples, the voltage generated by different units of the same model pen may vary by ±15%. Accordingly, a data model trained on a "golden pen" (e.g., a pen having a particular "golden voltage" and utilized to provide ground truth data) may output inaccurate distances when used with inputs from another pen that generates a voltage different from the golden voltage of the golden pen. As result, a data model trained using multiple pens with different voltages may output unreliable distance values.

The effects of different voltages may be mitigated by utilizing algorithms that do not include values of capacitive signals. However, such algorithms may output less accurate position and/or orientation values. Another solution would be to measure relative voltage generated by an input device. For example, a relative voltage generated by an input device may be calculated by positioning the input device at a specific location on a capacitive sensor and comparing the sensor's response to another pen positioned at the same location. However, it may be difficult to position the pen exactly, even during the training process, and it may be undesirable to request such positioning from an end-user.

Accordingly, examples are disclosed that relate to methods and computing devices for determining a distance of an input device from a surface of a computing device. In one example, a method comprises receiving a plurality of input device signals via the input device. A portion of the input device signals are used to determine an effective voltage of the input device. Adjusted input device signals are then calculated by adjusting subsequently received input device signals using the effective voltage of the input device. The method further comprises providing the adjusted input device signals as an input to a to a distance model that is used to calculate the distance of the input device from the surface of the computing device.

With reference now to FIG. 1, one example of a system 100 is illustrated that includes an input device 104 and a computing device 108 comprising a surface 112. The computing device 108 also comprises a processor 116 and a memory 120. The memory 120 stores instructions 124 executable by the processor 116 to determine a distance 128 of the input device 104 from the surface 112 of the computing device 108 as described herein. Additional details regarding the components and computing aspects of the computing device 108 are described in more detail below with reference to FIG. 9.

Figure 2:
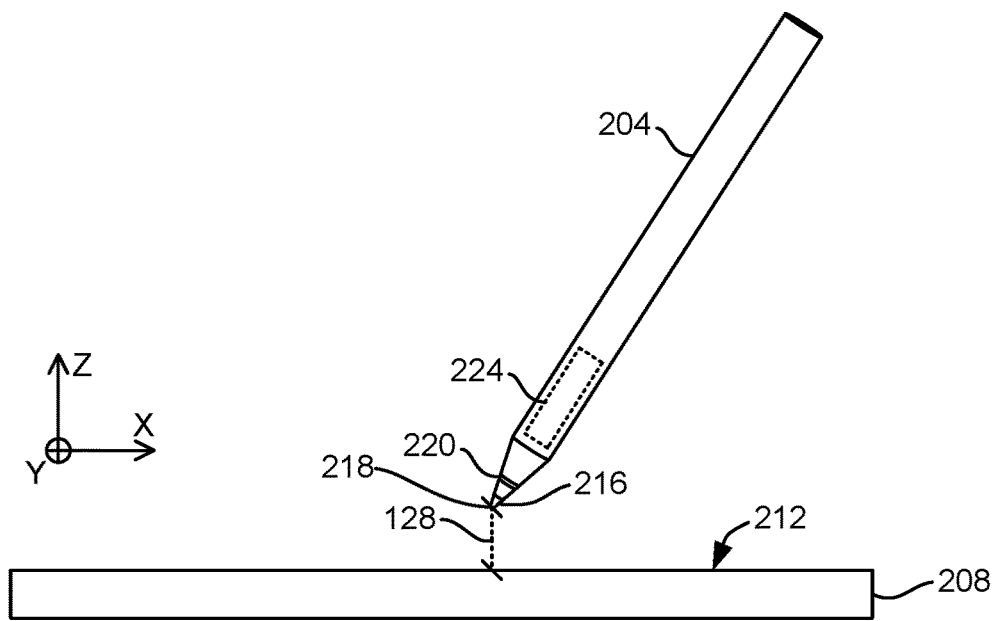
FIG. 2 shows an example of an input device and a computing device according to examples of the present disclosure.

The input device 104 and the computing device 108 may take any suitable form. With reference briefly to FIG. 2, the input device 104 may take the form of an electronic pen 204 and the computing device 108 may take the form of a tablet computing device 208. The surface 112 may take the form of a capacitive touch-screen surface 212 on the tablet computing device 208.

With reference again to FIG. 1, the computing device 108 is configured to receive a plurality of input device signals 132 via the input device 104. In some examples, as introduced above, the input device signals 132 are provided by a pressure sensor 136. In other examples, and as described in more detail below, the input device signals 132 take the form of a current generated in one or more sensors 144 in the surface 112 of the computing device 108 via one or more transmitters 140 of the input device 104.

As illustrated by example in FIG. 2, an input device in the form of an electronic pen 204 includes a tip transmitter 216 and a body transmitter 220. The tip transmitter 216 is located at the tip 218 of the pen 204, with the tip configured to contact the touch-screen surface 212. The body transmitter 220 is spaced from the tip 218. In the present example, the body transmitter 220 comprises a ring that encircles the body of the electronic pen 204 approximately 10 mm above the tip 218. In other examples, the body transmitter 220 may utilize different shapes and configurations, and may be spaced at different distances from the tip 218.

Figure 3:
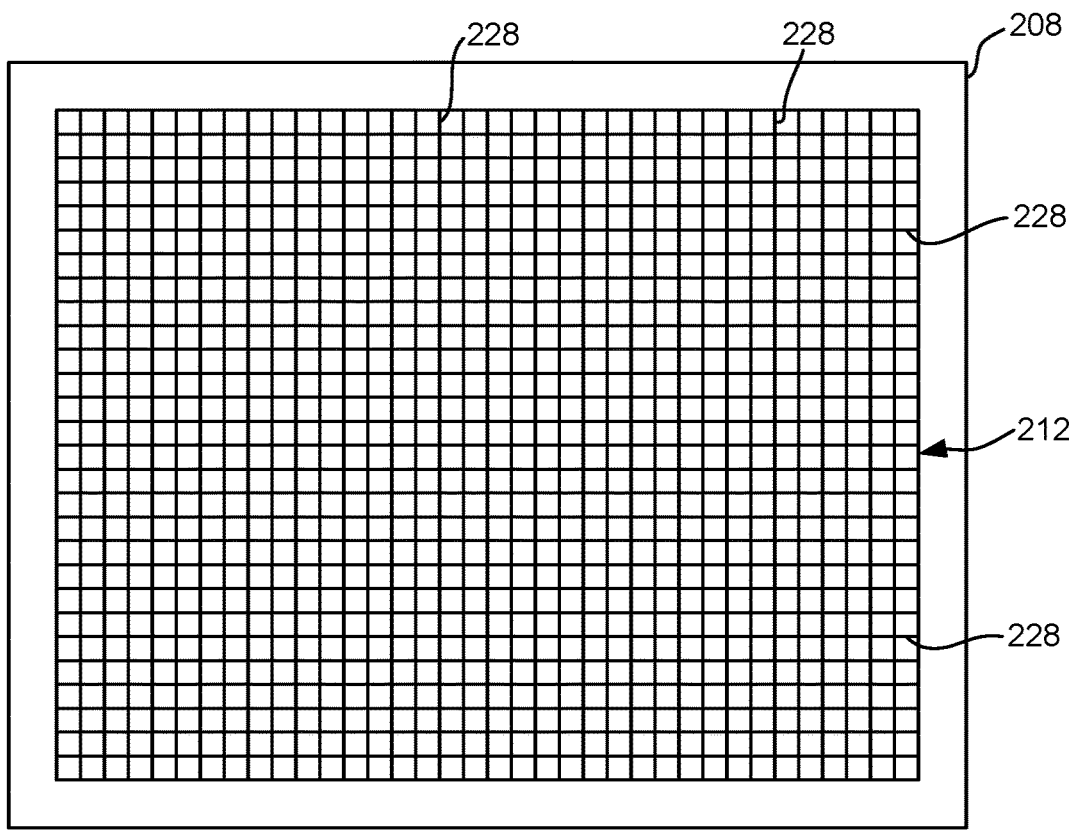
FIG. 3 shows another view of the example computing device of FIG. 2 according to examples of the present disclosure.

Each of the tip transmitter 216 and the body transmitter 220 is coupled to a power source 224. In some examples, the tip transmitter 216 and the body transmitter 220 are coupled to different power sources. Using power from the power source, and as described in more detail below, the tip transmitter 216 and the body transmitter 220 are capacitively linked to the touch-screen surface 212. As illustrated by example in FIG. 3, which shows another view of the tablet computing device 208 of FIG. 2, the touch-screen surface 212 includes a plurality of sensors in the form of antennas 228 that can detect the tip transmitter 216 and the body transmitter 220 of the electronic pen 204 via capacitive sensing. In the present example, the antennas 228 are arranged in an X-Y grid. In some examples, the touch-screen surface 212 may include 44-66 antennas extending perpendicular to the X-axis, and another 44-66 antennas extending perpendicular to the Y-axis. In the example of FIG. 3 and for ease of illustration, the touch-screen surface 212 includes 29 antennas 228 perpendicular to the X-axis, and 37 antennas 228 perpendicular to the Y-axis. In other examples, any suitable number and configuration of antennas may be utilized. For example, the antennas 228 may be arranged in a triangular grid, concentric circles, or any other suitable configuration.

With reference also to FIG. 2, a voltage applied to the tip transmitter 216 may generate a current in one or more of the antennas 228 in the touch-screen surface 212 of the tablet computing device 208. The current generated in each of the antennas 228 is converted to a digital signal by a digitizer, such as an analog-to-digital converter implemented in firmware of the tablet computing device 208.

In some examples, the tablet computing device 208 obtains input device signals from up to nine antennas 228 extending in the X-axis direction and up to nine antennas 228 extending in the Y-axis direction that each have portions surrounding the location of the tip transmitter 216. The signals may be processed (e.g. by the processor 116 of FIG. 1) using suitable capacitive sensing techniques to determine a position of the electronic pen 204 relative to the touch-screen surface 212 in the X- and Y-directions. In some examples, signals received from one or more antennas 228 via the body transmitter 220 may be processed (e.g. by the processor 116 of FIG. 1) using suitable capacitive sensing methods to determine a rotational orientation of the electronic pen, including tilt and/or azimuth, relative to the touch-screen surface 212. In some examples, and as described in more detail below with reference to FIG. 4, signals received via the tip transmitter 216 are used to determine a distance 128 of the electronic pen 204 from the touch-screen surface 212 in the Z-axis direction.

With reference again to FIG. 2 and as noted above, each of the tip transmitter 216 and the body transmitter 220 is coupled to power source 224. The power source 224 provides a voltage (V) that allows the tip transmitter 216 and the body transmitter 220 to generate a current in antennas of the touch-screen surface 212 that is proportional to the capacitance between the transmitters and each antenna. The power source 224 may provide any suitable voltage and any suitable current (e.g. AC or DC). For example, the power source 224 may provide 10-20V AC at a frequency of 150-170 kHz. In some examples, the power source 224 provides the same frequency and voltage to both the tip transmitter 216 and the body transmitter 220 (e.g. 10 V, 150 kHz). In other examples, the power source 224 provides different frequencies and/or voltages to the tip transmitter 216 and the body transmitter 220.

In some examples, the tip transmitter 216 and the body transmitter 220 may be activated at the same time. In other examples, the tip transmitter 216 and the body transmitter 220 may be activated at different times. For example, the tip transmitter 216 and the body transmitter 220 may each be energized during separate windows of time. In some examples, each window of time is the same length. In other examples, the tip transmitter 216 and the body transmitter 220 may be energized for different amounts of time. For example, the tip transmitter 216 may be energized for 1 ms, and the body transmitter 220 may be energized for 15 ms.

As noted above, voltages generated by different electronic pens may vary based on the pen's power supply and/or other components. As the signals used to determine position and/or orientation coordinates of a particular electronic pen are a function of its generated voltage, it may be difficult to obtain reliable coordinates for one electronic pen using a data model that was trained on a different pen that generates a different voltage. Furthermore, a data model trained using multiple electronic pens with different voltages may output unreliable coordinates, such as Z-axis distances of the input device from the surface of the computing device.

Accordingly, and in one potential advantage of the present disclosure, a Z-axis position of an input device relative to a computing device surface may be determined more accurately by first determining an effective voltage of the input device. Briefly, with reference again to FIG. 1 and as described in more detail below, the computing device 108 may calculate the effective voltage 148 of the input device 104 using a voltage data model 152. The computing device 108 may generate adjusted input device signals 156 using the effective voltage 148 of the input device 104. The computing device 108 may then use the adjusted input device signals 156 to more accurately determine the distance 128 of the input device 104 from the surface 112 of the computing device 108.

Figure 4:
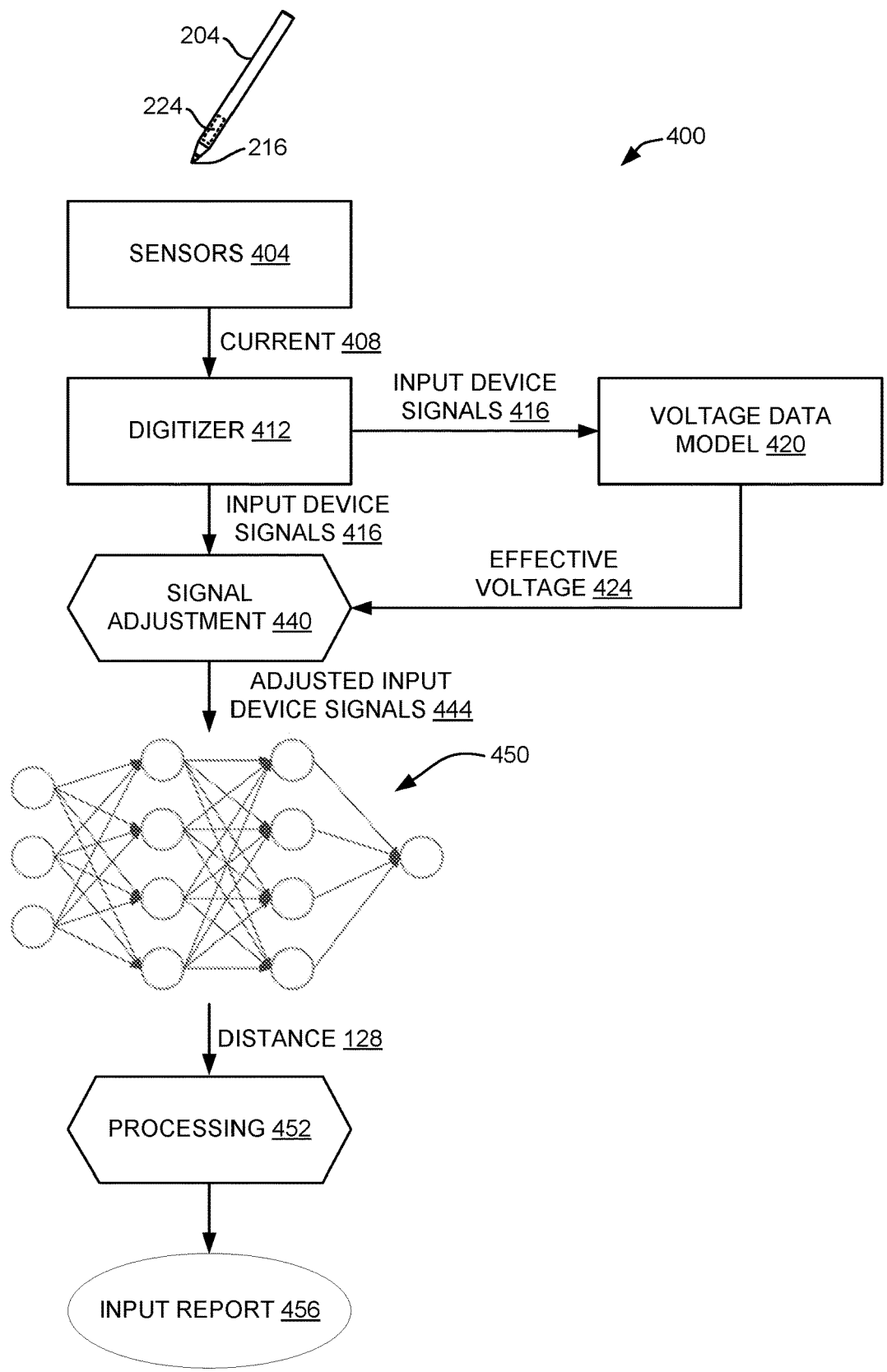
FIG. 4 is a diagram of an example method for determining a distance of an input device from a surface of a computing device according to examples of the present disclosure.

With reference now to FIG. 4, a flow diagram is provided depicting an example method 400 for determining a distance of an input device from a surface of a computing device using an effective voltage of the input device. The following description of method 400 is provided with reference to the software and hardware components described herein and shown in FIGS. 1-3 and 5-9. For example, the method 400 may be performed by the processor 116 of FIG. 1, firmware on the computing device 108 of FIG. 1 or the tablet computing device 208 of FIG. 2, an operating system or other software component of the computing device 108 or the tablet computing device 208, or some suitable combination of components described herein. It will be appreciated that method 400 also may be performed in other contexts using other suitable components.

As illustrated by example in FIG. 4, sensors 404 provide to a digitizer 412 current 408 that is generated via the tip transmitter 216 of the electronic pen 204. The sensors 404 may comprise the sensors 144 of FIG. 1 or the antennas 228 of FIG. 3. The digitizer 412 is configured to convert the current 408 from the sensors 404 into digital input device signals 416. In some examples, the digitizer 412 is at least partially implemented in firmware on a computing device, such as the computing device 108 of FIG. 1 or the tablet computing device 208 of FIGS. 2 and 3. In other examples, the method 400 may utilize raw or analog values of the current 408 as input device signals.

An effective voltage of the electronic pen 204 may be determined as follows. With reference again to FIG. 2, a voltage $V_t$ applied to the tip transmitter 216 ($t$) and a current $I_{tk}$ in an antenna 228 ($k$) are related as shown in equation (1):

$$I_{tk} = V_t \omega C_{tk} \quad (1)$$

in equation (1), $\omega$ represents an AC voltage frequency (multiplied by $2\pi$) and $C_{tk}$ represents the capacitance between the tip transmitter 216 ($t$) and an antenna 228 ($k$). Accordingly, the electronic pen 204 and another electronic pen manufactured to the same specifications and generating the same voltage, when positioned at the same location relative to antenna 228 ($k$), will create substantially the same C values. However, and as noted above, the voltage $V_t$ generated by an electronic pen power source may vary from one device to another, due to factors such as variations in power sources. It follows that such varying voltages can cause a data model trained on a golden pen having a golden voltage to output inaccurate distances when used with inputs from other pens that generate different voltages. For purposes of the present disclosure, "golden voltage" is defined as the voltage of a golden input device, such as an electronic pen, that is utilized to provide ground truth data in training a voltage data model. In this way it will be appreciated that the golden input device is a particular device against which all later devices are tested and judged. The term "golden" in this context is used to convey that this particular device is used to establish a baseline "golden" voltage. The golden voltage is the output voltage of this particular input device and forms calibration data for subsequent usage of other devices. In some examples, a golden input device may be an idealized device that outputs a precise and/or known golden voltage. Thus and as described in more detail below, the present disclosure provides techniques for determining and utilizing an effective voltage of a given electronic pen to compensate for such varying voltages.

Initially it will be appreciated that the current $I_{tk}$ induced in the antenna 228 ($k$) by the tip transmitter 216 ($t$) is linearly proportional to $V_t$. As shown in equation (2), if $V_t$ is changed by some factor a, the current $I_{tk}$ changes by the same factor a.

$$aI_{tk} = aV_t \omega C_{tk} \quad (2)$$

Using this relationship, an effective voltage of the electronic pen 204 may be calculated from the current $I_{tk}$ by utilizing a voltage data model 420 that is trained by a golden pen having a golden voltage. For example, and with reference again to FIG. 4, the digitizer 412 may provide the input device signals 416 to voltage data model 420 (e.g. the voltage data model 152 of FIG. 1) to calculate an effective voltage 424 of an input device. In some examples, and as described in more detail below with reference to FIG. 5, the voltage data model 420 is a linear regression model that is trained on a golden pen. It will also be appreciated that the voltage data model 420 may comprise any other suitable type of data model, including machine learning models and neural networks. For example, the voltage data model 420 may comprise a neural network trained to determine the effective voltage 424 at runtime using reinforcement learning.

As described in more detail below, and once an effective voltage has been determined, at 440 input device signals 416 are adjusted using the effective voltage 424 to generate adjusted input device signals 444. The adjusted input device signals 444 are then provided to a distance model, such as neural network 450, to determine the distance 128 of the electronic pen from the surface of the computing device. At 452 additional processing using the distance 128 may be performed to generate an input report 456, which may be output to one or more devices or applications as a user input.

Figure 5:
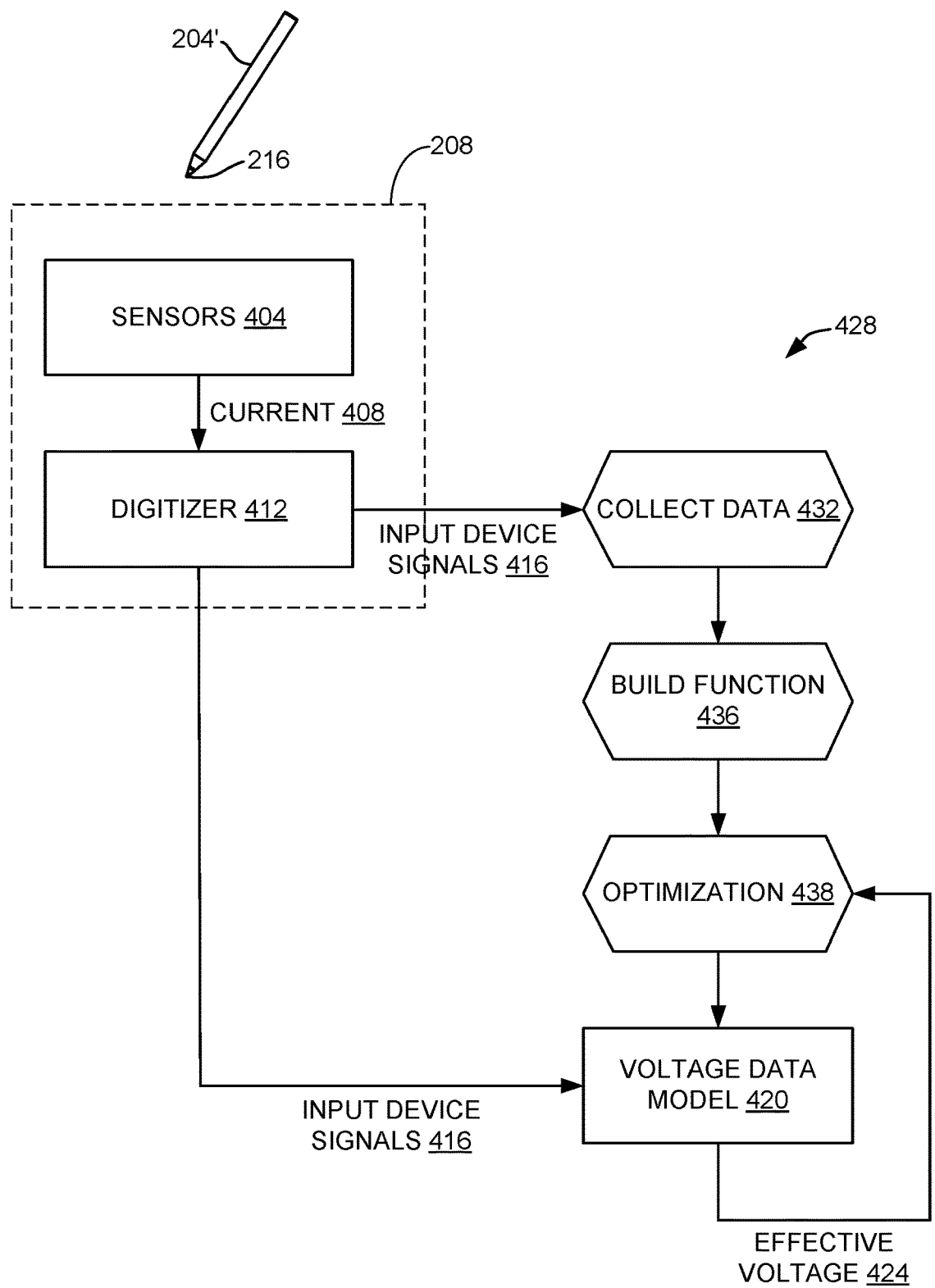
FIG. 5 is a diagram of an example method for building a voltage data model according to examples of the present disclosure.

Additional description of the voltage data model 420 will now be provided. With reference now to FIG. 5, a flow diagram is provided depicting one example of a method 428 for building a voltage data model 420. In this example, a golden pen is utilized in the form of electronic pen 204' that has the same components and functionality as electronic pen 204 described herein. The following description of method 428 is provided with reference to the software and hardware components described herein and shown in FIGS. 1-4 and 6-9. It will be appreciated that method 428 also may be performed in other contexts using other suitable components.

In some examples, the method 428 may be performed during manufacturing of the tablet computing device 208 or other computing device to produce the voltage data model 420. The resulting trained voltage data model 420 may be loaded into the computing devices during manufacturing, upon installation of an operating system, or at other appropriate timeframes. In other examples, portions of the method 428 may be performed at runtime on a computing device, or on a combination of one or more manufacturer computing devices and one or more end user computing devices.

As illustrated in FIG. 5, electronic pen 204' energizes sensors 404 in a computing device, such as tablet computing device 208, to produce current 408 in the sensors 404. A digitizer 412 converts the current 408 into digital input device signals 416. At 432, the method 428 includes collecting data in the form of the input device signals 416. Such data is collected while the electronic pen 204' is moved to a plurality of positions and orientations relative to the tablet computing device 208. In some examples, such data also is collected on condition of determining that the electronic pen 204' is contacting the surface of the tablet computing device 208.

For example, the computing device 208 may determine that the electronic pen 204' is contacting the surface 212 of the computing device by receiving a pressure signal from a pressure sensor 136 (e.g. a pressure sensor in the tip of the pen). In other examples, the computing device 208 determines that the electronic pen 204' is contacting the surface 212 by determining that the pen is moving across the surface. For example, the computing device 208 may determine that the electronic pen 204' is contacting the surface at one or more points in the middle of an electronic pen stroke.

In these examples, and given that the data is collected while the pen tip is contacting the surface of the computing device, a capacitance between a transmitter of the electronic pen and the sensors 404 may be expressed as a function of the pen's tilt ($\Theta$), azimuth ($\varphi$), and position (in x/y coordinates) relative to the sensors 404 (e.g. the antennas 228 of FIG. 3). Accordingly, the current 408 ($I_k$) on a sensor 404 ($k$) may be represented as follows:

$$I_k = V\omega C_k(x, y, \Theta, \varphi) \quad (3)$$

where $\omega$ represents an AC voltage frequency (multiplied by $2\pi$). Modeling this relationship using a function that is linear when signals from each sensor are scaled together and that is not dependent on (x,y,$\Theta$,$\varphi$) may simplify calculation of the voltage V. The following equations show one example of such a linear function:

$$F(I_1(x,y,\Theta,\varphi), I_2(x,y,\Theta,\varphi), \ldots, I_n(x,y,\Theta,\varphi)) = F(V\omega C_1, V\omega C_2 \ldots, V\omega C_n) \quad (4)$$

$$F(V\omega C_1, V\omega C_2 \ldots, V\omega C_n) = V*F(\omega C_1(x,y,\Theta,\varphi), \omega C_2(x,y,\Theta,\varphi) \ldots, \omega C_n(x,y,\Theta,\varphi)) \quad (5)$$

In some examples, we put as a requirement that $F(\omega C_1, \omega C_2 \ldots \omega C_n)$ is a constant function with a value of C for the golden pen. Accordingly, an effective voltage V for any other pen may be calculated as follows:

$$V = \frac{F(I_1(x, y, \Theta, \varphi), I_2(x, y, \Theta, \varphi), \ldots, I_n(x, y, \Theta, \varphi))}{C} \quad (6)$$

In this manner, calculating the value of F at one point and dividing by C yields the voltage V of the pen.

With reference again to FIG. 5, at 436, the method 428 includes building a function using the principles outlined above. For example, a function F may comprise a polynomial including a sum of signals from a plurality of sensors ($I_1, I_2, \ldots, I_n$) with coefficients ($k_n$):

$$F(I_1, I_2, \ldots, I_n) = k_1 I_1 + \ldots + k_n I_n \quad (7)$$

To find the coefficients ($k_n$), at 438, the method 428 includes optimizing the function F to generate the voltage data model 420. The function may be optimized to find coefficients that make the function F as constant as possible. The coefficients may be optimized using any suitable algorithm. For example, the coefficients may be optimized using linear regression.

However, the polynomial function described above in equation (7) may continue to fluctuate slightly as a function of (x, y, $\Theta$, $\varphi$) Accordingly, a more constant function may be built by considering non-linear features. One example is provided below in equation (8):

$$F(I_1, I_2, \ldots, I_n) = k_1 I_1 + \ldots + k_n I_n + k_{ij} \frac{I_i I_j}{I_1 + \ldots + I_n} \quad (8)$$

In equation (8), $k_i$ and $k_{ij}$ represent a set of coefficients that may be optimized to make the function more constant.

In some examples, a function that incorporates tilt ($\Theta$) and azimuth ($\varphi$) of the pen may be utilized for the voltage data model 420. In these examples, signals from a plurality of transmitters on the pen may be utilized to incorporate tilt ($\Theta$) and azimuth ($\varphi$). For example and with reference to FIG. 2, a tip signal received via the tip transmitter 216 and a body signal received via the body transmitter 220 of electronic pen 204 may be utilized.

However, in some examples the tip transmitter 216 and the body transmitter 220 may have different voltages, for example due to each transmitter having different drivers in the electronic pen 204'. To take the tip transmitter 216 and the body transmitter 220 into account, a "signal moment" M may be used to represent signals received along each axis of the touch-screen surface. In some examples, signal moment M comprises a sum of a plurality of signals along each axis. For example, $M_{TX0}$ is a sum of signals $I_{TX}$ received via the tip transmitter 216 along the X-axis of the touch-screen surface 212:

$$M_{TX0} = \Sigma_i I_{Txi} \quad (9)$$

An X-axis moment, $M_{TX1}$, represents a position of the center of mass for the tip along the X-axis:

$$M_{TX1} = \frac{\sum_i i * I_{TXi}}{M_{TXo}} \quad (10)$$

Similarly, $M_{TY0}$ is a sum of signals $I_{TY}$ received via the tip transmitter 216 along the Y-axis of the touch-screen surface 212. A Y-axis moment, $M_{TY1}$, represents a position of the center of mass for the tip along the Y-axis.

Higher order moments of order S are a sum of signals with position centered to the center of mass:

$$M_{TXs} = \frac{\sum_i (i - M_{TX1})^s * I_{TXi}}{M_{TXo}} \quad (11)$$

When S is 2, the moment M may represent a width of a bell-shaped curve produced on the antennas 228 of FIG. 3 by the tip transmitter 216. The moment M may represent skew when S is 3. Additionally, when S is greater than zero, the moment $M_{TXS}$ is not a function of voltage. Correspondingly, when S is zero the moments $M_{TX0}$, $M_{TY0}$, $M_{RX0}$, $M_{RY0}$ are a function of voltage, where $M_{RX0}$, $M_{RY0}$ represent the moments of the body transmitter 220 in the X- and Y-axes, respectively.

A set of features f may be built using the following moments: $M_{TX0}$, $M_{TY0}$, $M_{TX1}$, $M_{TY1}$, $M_{TX2}$, $M_{TY2}$, $M_{TX3}$, $M_{TY3}$, $M_{TX4}$, $M_{TY4}$, $M_{RX1}$, $M_{RY1}$, $M_{RX2}$, $M_{RY2}$. The last 12 moments M in this list ($M_{TX1}$, $M_{TY1}$, $M_{TX2}$, $M_{TY2}$, $M_{TX3}$, $M_{TY3}$, $M_{TX4}$, $M_{TY4}$, $M_{RX1}$, $M_{RY1}$, $M_{RX2}$, $M_{RY2}$) may be designated as $M_{fi}$. In some examples, the S-order moments for the body transmitter 220 may not be used. The first two moments ($M_{TX0}$, $M_{TY0}$) are a linear function of voltage.

In the following example of a set of features f, variables i and j range from 1 to 12, the moments $M_{TX0}$ or $M_{TY0}$ are included one time, and all other moments M are included up to a power of 2:

$$f_1 = M_{TX0} \quad (12)$$

$$f_2 = M_{TY0} \quad (13)$$

$$f_{1i} = M_{TX0} M_{fi} \quad (14)$$

$$f_{2i} = M_{TY0} M_{fi} \quad (15)$$

$$f_{1ij} = M_{TX0} M_{fi} M_{fj} \quad (16)$$

$$f_{2ij} = M_{TY0} M_{fi} M_{fi} \quad (17)$$

This feature set includes a total of 182 features f. Each feature is linear with respect to the voltage, as it includes $M_{TX0}$ or $M_{TY0}$ one time, and the remaining moments are dimensionless on voltage. In this manner, a function F may be defined as a linear sum of these features, with each feature denoted in simplified form as f, and with coefficients $k_i$:

$$F = \Sigma_{i=1}^{i=182} k_i f_i \quad (18)$$

Linear regression may be used to find suitable values of $k_i$ such that F is as constant as possible across different points. For example, coefficients $k_1, \ldots, k_{182}$ may be set such that when the function F is trained on a golden pen (e.g. using 50,000 samples), the function outputs a mean value of 1 when subsequently evaluated on the golden pen. In some examples, the function F outputs a normal distribution of values with a mean of 1 and a standard deviation of approximately 2.4-2.5% on a subset of training data from the golden pen.

Evaluating the function F on another input device, such as a second electronic pen, outputs the effective voltage of that device as a fraction (k) that represents a determined (actual) voltage of the input device $V_x$ divided by a golden voltage ($V_G$) of a golden input device:

$$k = \frac{V_x}{V_G} \quad (19)$$

For example, an output of 0.9 indicates that the voltage of the input device is 90% of the voltage of the golden pen. In this manner, a voltage data model 420 utilizing the function F can calculate the effective voltage of a given input device.

With reference again to FIG. 4, the voltage data model 420 may be applied to calculate an effective voltage 424 of electronic pen 204. As the output of the voltage data model 420 may be subject to some variation, an initial portion of input device signals 416 may be collected and used to calculate an average effective voltage before adjusting at 440 subsequently received input device signals that comprise another portion of the signals. In some examples, the initial portion includes between 100-1000 input device signals. For example, a moving average effective voltage may be calculated using the most recent 1000 input device signals 416.

In some examples, a portion of input device signals 416 are received via the electronic pen 204 for at least a threshold period of time before using the input device signals to determine an effective voltage 424 of the input device, followed by determining the distance of the input device from the surface of the computing device using the adjusted input device signals. For example, a reliable value of the effective voltage 424 may be determined by averaging a set of 500 input device signals. In some examples, the input device signals 416 are sampled every 10 ms, and 500 samples may be accumulated in 5 seconds. Accordingly, the threshold period of time may be set to a predetermined value of 5 seconds. In some examples, the resulting value of the effective voltage 424 may be repeatable within 0.5% on each run, which may correspond to an accuracy of 0.5%. In some examples, this initial calculation of the average effective voltage may be performed as part of the out-of-box-experience when an end-user first begins using the electronic pen 204 with the tablet computing device 208.

In some examples, and in a similar manner as described above with respect to FIG. 5, only input device signals 416 that are collected while the electronic pen 204 is contacting the surface of the tablet computing device 208 are used in calculating the effective voltage. As noted above, the computing device 208 may determine that the electronic pen 204 is contacting the surface 212 of the tablet computing device 208 via a pressure signal received from a pressure sensor in the tip of the pen. In other examples, the computing device 208 determines that the electronic pen 204 is contacting the surface 212 by determining that the pen is performing an electronic pen stroke on the surface.

In some examples, and with reference again to FIG. 5, the effective voltage 424 output by the voltage data model 420 may be used to continue training and optimizing the voltage data model 420 at 438. In this manner, the voltage data model 420 may be at least partially trained at runtime using additional input device signals 416 and effective voltages 424, which may improve the accuracy of the voltage data model 420 over time.

In other examples, input device signals 416 may be collected from a one or more additional user input devices. For example, training data may be collected using one, two, three, or more electronic pens in addition to the golden pen. Each of the input device signals 416 from each additional pen may be divided by the effective voltage determined for the golden pen before using it in the training process. In this manner, the voltage data model 420 may avoid becoming over-fit and may reflect variation in electrical characteristics and geometries among input devices.

Returning again to the method of FIG. 4, and once an effective voltage 424 is determined, at 440 the method 400 includes adjusting input device signals 416 using the effective voltage 424 to generate adjusted input device signals 444. As described above, the input device signals 416 are adjusted by dividing the input device signals by the effective voltage 424. In this manner, the adjusted input device signals 444 are scaled to a standardized voltage as described above.

The adjusted input device signals 444 are then used to determine a distance 128 of the electronic pen 204 from the surface of the computing device. As described above, the distance 128 corresponds to a Z-axis position of the tip 218 of the electronic pen 204 relative to the surface of the computing device. In some examples, the distance 128 is determined by providing the adjusted input device signals 444 to a distance data model configured to output the distance. Some examples of suitable data models include linear or non-linear functions (e.g. optimized using a regression algorithm), neural networks, and other machine learning data models.

In the example of FIG. 4, the adjusted input device signals 444 are provided to a neural network 450 that determines the distance 128. In some examples, the neural network 450 comprises a fully connected 2-layer network that receives the adjusted input device signals 444 and outputs the distance 128. In other examples, any suitable neural network configuration may be utilized.

In some examples, the neural network 450 is built and trained during manufacturing of the computing device. For example, the neural network 450 may be trained by collecting input device signals when an input device is positioned on the surface and at varying distances away from the surface, such as 50 µm, 0.1 mm, 0.2 mm, etc. Like the voltage data model 420, the trained neural network 450 may be loaded onto one or more end-user computing devices during manufacturing of the computing devices. In other examples, at least a portion of the neural network 450 may be built and/or further trained at runtime on the computing device, or on a combination of one or more manufacturer computing devices and one or more end user computing devices.

Figure 6:
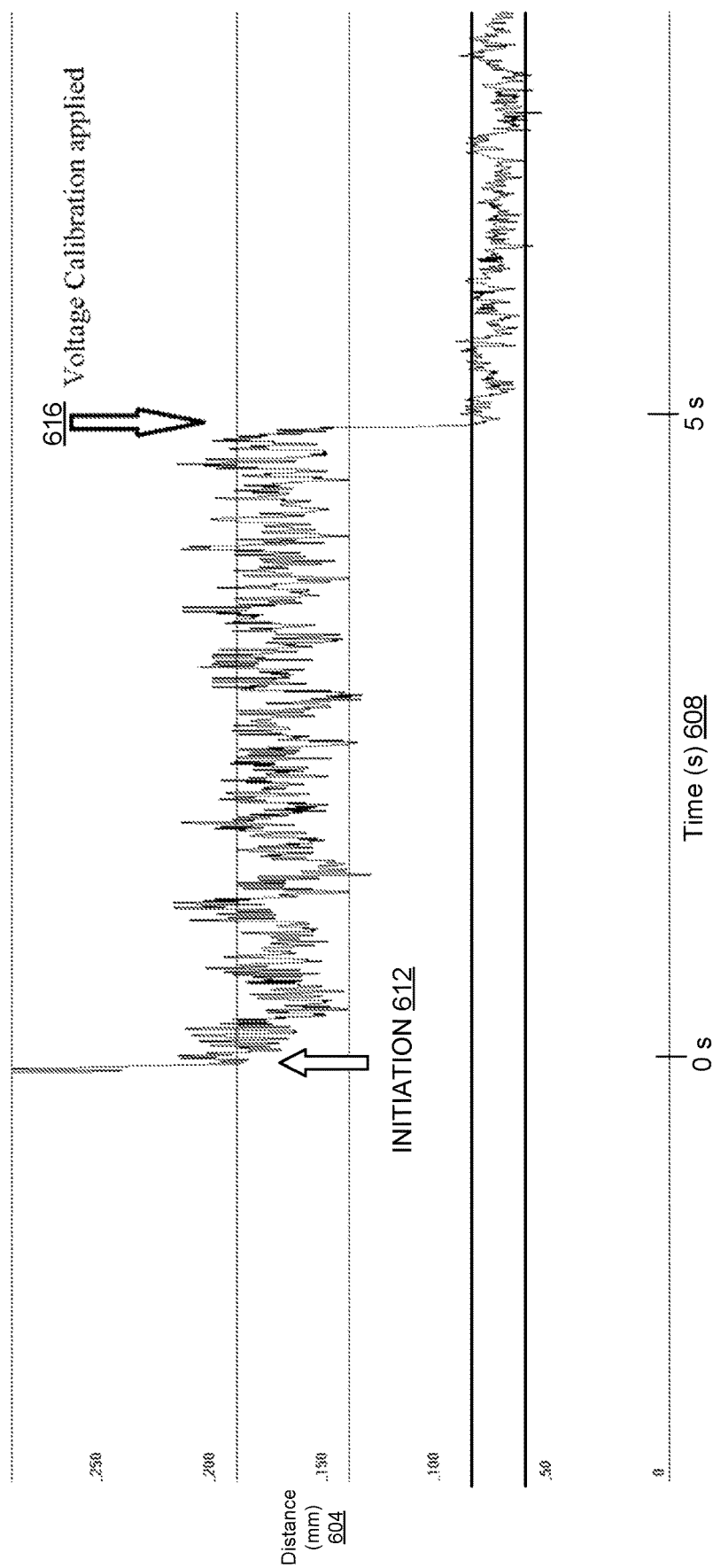
FIG. 6 shows a plot of a determined distance of an input device from a surface of a computing device over time according to examples of the present disclosure.

FIG. 6 shows one example of distance values determined using an effective voltage of an input device that is calibrated according to the method 400 of FIG. 4. FIG. 6 shows a determined distance 604 of the tip of an input device from a surface of a computing device over time 608. The determined distance 604 is plotted in millimeters (mm) and the time 608 is plotted in seconds (s), with the distance 604 sampled and plotted at 10 millisecond (ms) intervals. The input device was in continuous contact with the surface at all times, such that the actual distance was 0 mm.

At 612 (time=0 seconds), distance calculation was initiated without adjusting the input device signals based on an effective voltage of the input device. From 0 seconds to 5 seconds, the distance 604 was determined by providing a portion of raw digital input device signals from the digitizer to the neural network 450. The neural network 450 output values of the distance 604 between approximately 140 mm and approximately 200 mm.

During the initial 5 seconds, 500 samples of input device signals were collected and used to determine an average effective voltage of the input device. As indicated at 616, after 5 seconds the distance 604 was determined using the average effective voltage to calibrate these subsequent input device signals as described above regarding FIG. 4. In the present example, the effective voltage of the input device was 0.85.

Without voltage adjustment, the distance 604 determined by the neural network 450 was in a range of approximately 120 to 220 microns. Following implementation of the effective voltage at 616, the distance 604 determined by the neural network 450 on this other portion of input device signals was between approximately 60 microns and approximately 85 microns. As illustrated by example in FIG. 6, using the method 400 of FIG. 4 to determine the distance 604 resulted in improved accuracy and precision.

In some examples, it may be desirable to report whether an input device is either contacting a surface of a computing device or within a threshold distance of the surface. For example, as introduced above, the tablet computing device 208 of FIG. 2 may display electronic ink when the tip 218 of the electronic pen 204 is placed on the touch-screen surface 212. In some examples, the tablet computing device 208 may determine that the tip 218 is contacting the touch-screen surface 212 when the determined distance 128 is less than a threshold distance. For example, to provide a natural and realistic user experience, the threshold may be set at a suitable level within a typical user's motor capabilities. For example, a typical user may be able to manipulate the electronic pen 204 with a precision of about 0.1 mm. Accordingly, the threshold distance may be set at 0.1 mm or less. The tablet computing device 208 may additionally or alternatively include hysteresis in determining whether the tip 218 of the electronic pen 204 is contacting the touch-screen surface 212.

Accordingly, and with reference again to FIGS. 4 and 452, the method 400 may include performing additional processing using the distance 128 to generate an input report 456. The input report 456 may be output to the operating system of the tablet computing device 208, to an application running on the device, or to one or more other devices or applications. In some examples, the processing 452 may include one or more of time-series smoothing, clipping, hysteresis processing, state machine, and applying any other suitable algorithms or transformations to the distance value 128.

In other examples, different functionality may be enabled based on the distance 128 of the tip 218 from the surface 212. For example, the tablet computing device 208 of FIG. 2 may include an "airbrush" mode in which different amounts of electronic ink are displayed based on the distance 128. For example, when the distance is greater than a threshold distance (e.g. 25 mm), the tablet computing device 208 may not display electronic ink. When the distance 128 is less than the threshold distance, the tablet computing device 208 may display more electronic ink as the distance 128 decreases.

Figure 7A:
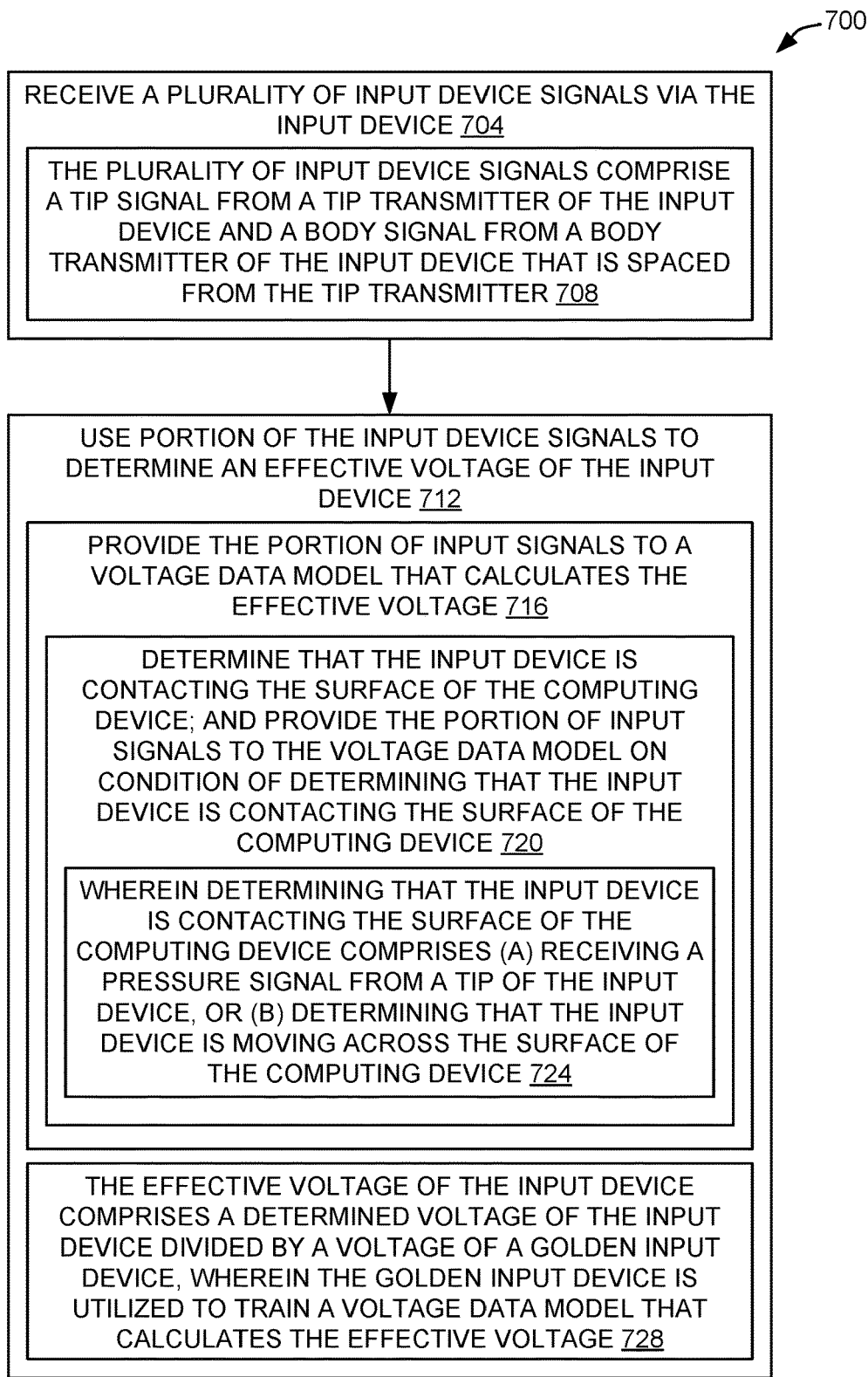
FIGS. 7A and 7B show a block diagram of another example method for determining a distance of an input device from a surface of a computing device according to examples of the present disclosure.
Figure 7B:
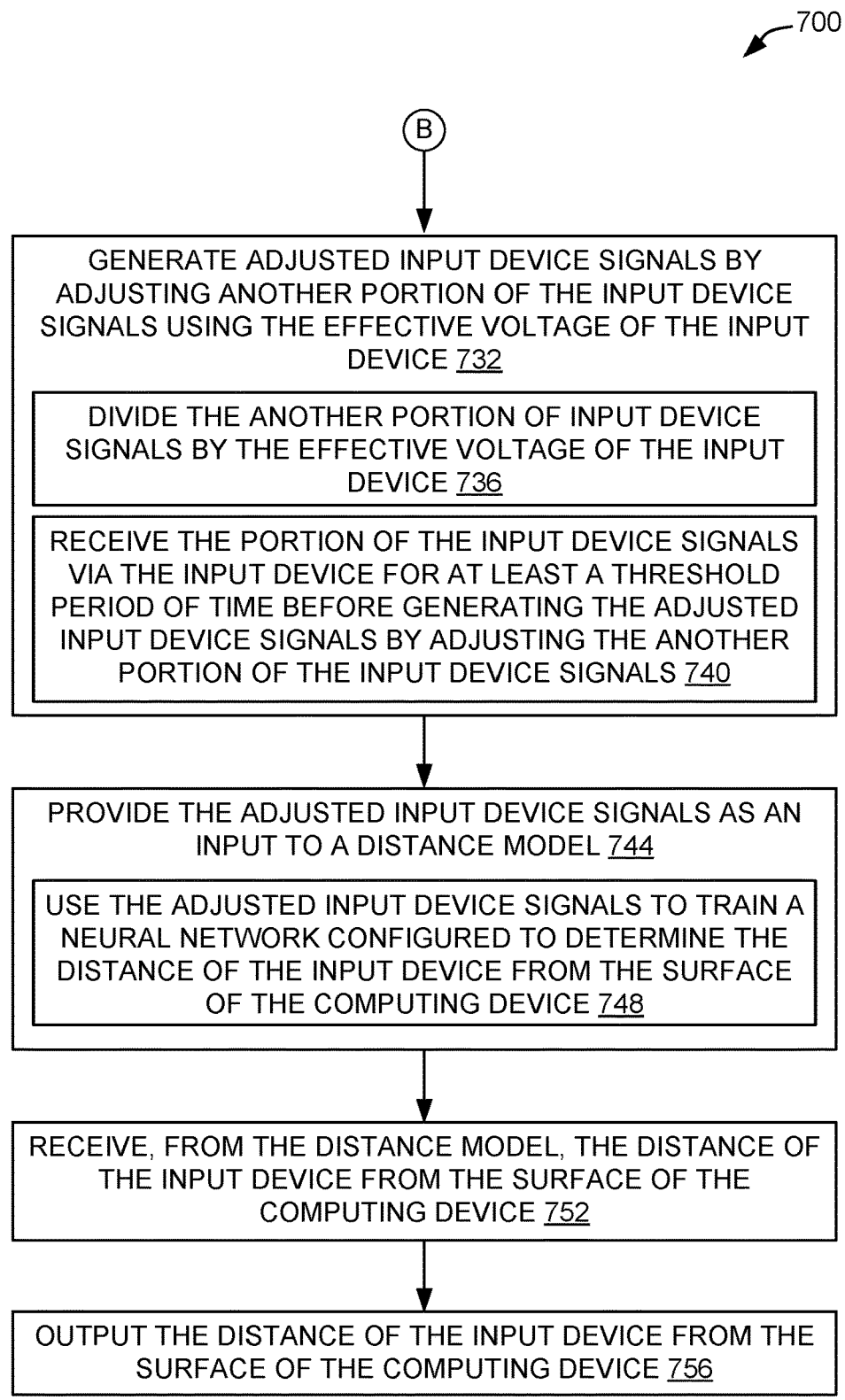

With reference now to FIGS. 7A and 7B, a flow diagram is provided depicting an example method 700 for determining a distance of an input device from a surface of a computing device. The following description of method 700 is provided with reference to the software and hardware components described herein and shown in FIGS. 1-6 and 9. For example, the method 700 may be performed by the processor 116 of FIG. 1, firmware on the computing device 108 of FIG. 1 or the tablet computing device 208 of FIG. 2, an operating system or other software component of the computing device 108 or the tablet computing device 208, or some suitable combination of components described herein. It will be appreciated that method 700 also may be performed in other contexts using other suitable components.

With reference to FIG. 7A, at 704, the method 700 includes receiving a plurality of input device signals via the input device. At 708, the method 700 may include, wherein the plurality of input device signals comprise a tip signal from a tip transmitter of the input device and a body signal from a body transmitter of the input device that is spaced from the tip transmitter.

At 712, the method 700 includes using a portion of the input device signals to determine an effective voltage of the input device. At 716, the method 700 may include, wherein using the portion of input device signals to determine the effective voltage of the input device comprises providing the portion of input device signals to a voltage data model that calculates the effective voltage. At 720, the method 700 may include determining that the input device is contacting the surface of the computing device; and providing the portion of the input device signals to the voltage data model on condition of determining that the input device is contacting the surface of the computing device. At 724, the method 700 may include, wherein determining that the input device is contacting the surface of the computing device comprises (a)

receiving a pressure signal from a tip of the input device, or (b) determining that the input device is moving across the surface of the computing device. At 728, the method 700 may include, wherein the effective voltage of the input device comprises a determined voltage of the input device divided by a voltage of a golden input device, wherein the golden input device is utilized to train a voltage data model that calculates the effective voltage.

With reference now to FIG. 7B, at 732, the method 700 includes generating adjusted input device signals by adjusting another portion of input device signals using the effective voltage of the input device. At 736, the method 700 may include, wherein generating the adjusted input device signals comprises dividing the other portion of input device signals by the effective voltage of the input device. At 740, the method 700 may include receiving the portion of the input device signals via the input device for at least a threshold period of time before generating the adjusted input device signals by adjusting the another portion of the input device signals.

At 744, the method includes providing the adjusted input device signals as an input to a distance model. At 748, the method 700 may include using the adjusted input device signals to train a neural network configured to determine the distance of the input device from the surface of the computing device. At 752, the method 700 includes receiving, from the distance model, the distance of the input device from the surface of the computing device. At 756, the method 700 includes outputting the distance of the input device from the surface of the computing device.

Figure 8:
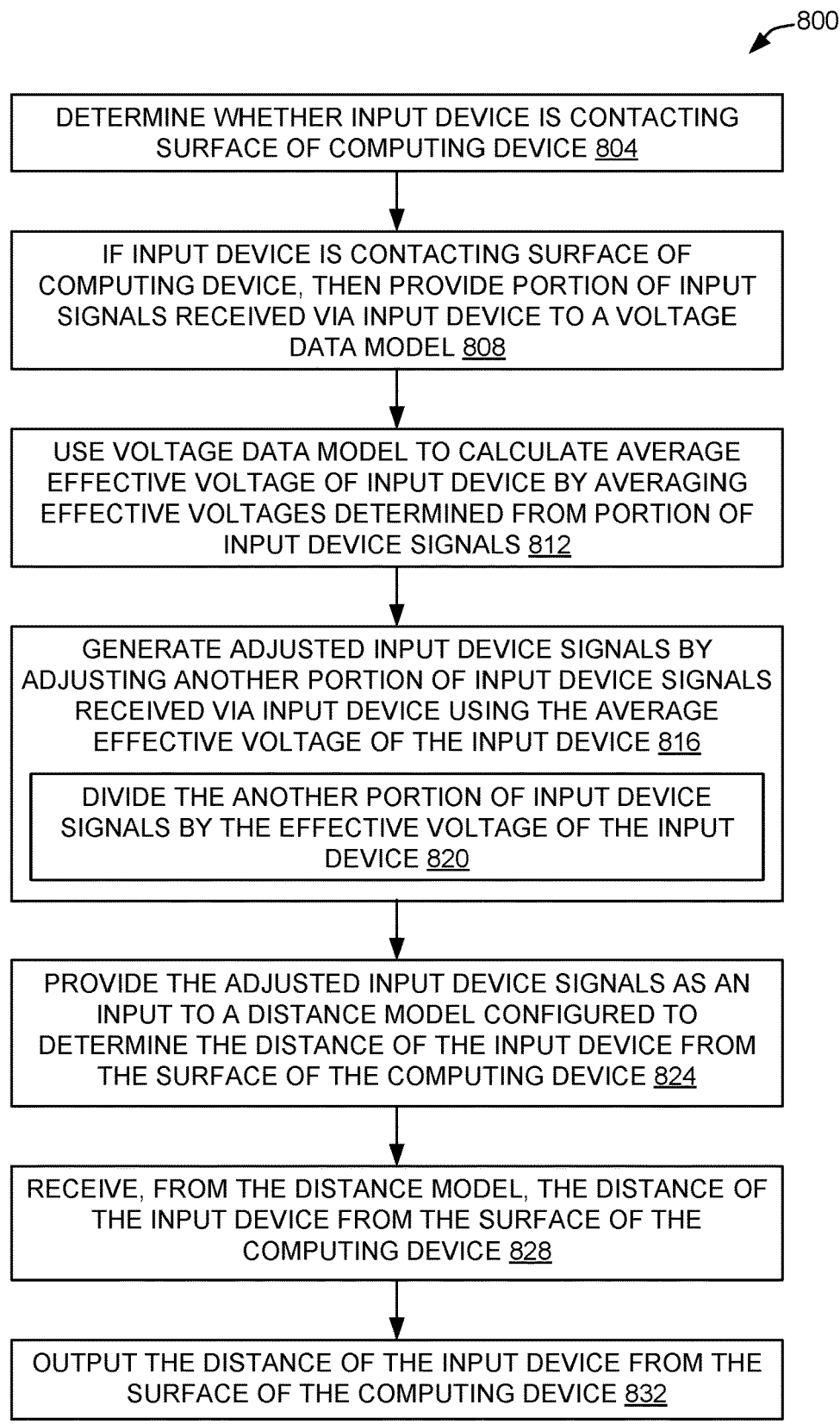
FIG. 8 shows a block diagram of another example method for determining a distance of an input device from a surface of a computing device according to examples of the present disclosure.

With reference now to FIG. 8, a flow diagram is provided depicting another example method 800 for determining a distance of an input device from a surface of a computing device. The following description of method 800 is provided with reference to the software and hardware components described herein and shown in FIGS. 1-6 and 9. For example, the method 800 may be performed by the processor 116 of FIG. 1, firmware on the computing device 108 of FIG. 1 or the tablet computing device 208 of FIG. 2, an operating system or other software component of the computing device 108 or the tablet computing device 208, or some suitable combination of components described herein. It will be appreciated that method 800 also may be performed in other contexts using other suitable components.

At 804, the method 800 includes determining whether the input device is contacting the surface of the computing device. At 808, the method 800 includes, if the input device is contacting the surface of the computing device, then providing a portion of input device signals received via the input device to a voltage data model. At 812, the method 800 includes using the voltage data model to calculate an average effective voltage of the input device by averaging effective voltages determined from the portion of input device signals. At 816, the method 800 includes generating adjusted input device signals by adjusting another portion of input device signals received via the input device using the average effective voltage of the input device.

At 820, the method 800 may include wherein generating the adjusted input device signals comprises dividing the other portion of input device signals by the average effective voltage of the input device. At 824, the method 800 includes providing the adjusted input device signals as an input to a distance model configured to determine the distance of the input device from the surface of the computing device. At 828, the method 800 includes receiving, from the distance model, the distance of the input device from the surface of the computing device. At 832, the method 800 includes outputting the distance of the input device from the surface of the computing device.

Figure 9:
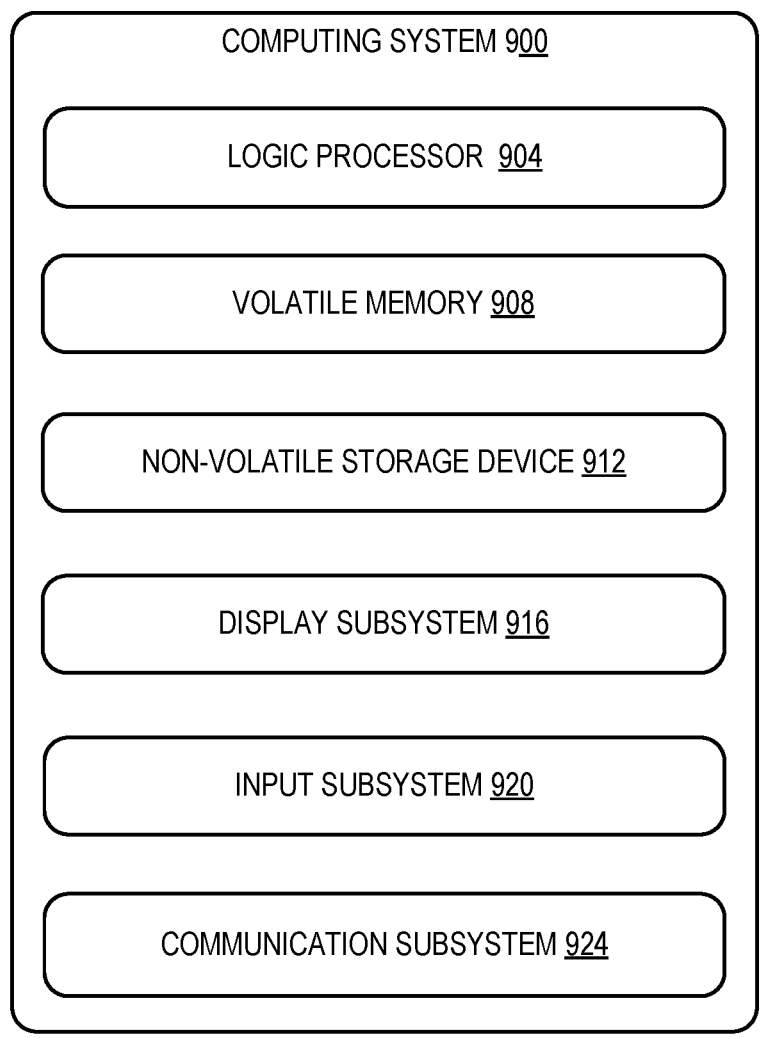
FIG. 9 is a block diagram of an example computing system according to examples of the present disclosure.

FIG. 9 schematically shows a non-limiting embodiment of a computing system 900 that can enact one or more of the methods and processes described above. Computing system 900 is shown in simplified form. Computing system 900 may take the form of one or more wearable devices, personal computers, server computers, tablet computers, home-entertainment computers, network computing devices, gaming devices, mobile computing devices, mobile communication devices (e.g., smart phone), and/or other computing devices. In the above examples, input device 104, computing device 108, electronic pen 204, and tablet computing device 208 may comprise computing system 900 or one or more aspects of computing system 900.

Computing system 900 includes a logic processor 904, volatile memory 908, and a non-volatile storage device 912. Computing system 900 may optionally include a display subsystem 916, input subsystem 920, communication subsystem 924, and/or other components not shown in FIG. 9. Logic processor 904 includes one or more physical devices configured to execute instructions. For example, the logic processor may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 904 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 904 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Volatile memory 908 may include physical devices that include random access memory. Volatile memory 908 is typically utilized by logic processor 904 to temporarily store information during processing of software instructions. It will be appreciated that volatile memory 908 typically does not continue to store instructions when power is cut to the volatile memory 908.

Non-volatile storage device 912 includes one or more physical devices configured to hold instructions executable by the logic processors to implement the methods and processes described herein. When such methods and processes are implemented, the state of non-volatile storage device 912 may be transformed—e.g., to hold different data.

Non-volatile storage device 912 may include physical devices that are removable and/or built-in. Non-volatile storage device 912 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppydisk drive, tape drive, MRAM, etc.), or other mass storage device technology. Non-volatile storage device 912 may include nonvolatile, dynamic, static, read/write, read-only, sequential-access, location-addressable, file-addressable, and/or content-addressable devices. It will be appreciated that non-volatile storage device 912 is configured to hold instructions even when power is cut to the non-volatile storage device 912.

Aspects of logic processor 904, volatile memory 908, and non-volatile storage device 912 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "program" and "application" may be used to describe an aspect of computing system 900 typically implemented in software by a processor to perform a particular function using portions of volatile memory, which function involves transformative processing that specially configures the processor to perform the function. Thus, a program or application may be instantiated via logic processor 904 executing instructions held by non-volatile storage device 912, using portions of volatile memory 908. It will be understood that different programs and/or applications may be instantiated from the same application, service, code block, object, library, routine, API, function, etc. Likewise, the same program and/or application may be instantiated by different applications, services, code blocks, objects, routines, APIs, functions, etc. The terms "program" and "application" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 916 may be used to present a visual representation of data held by non-volatile storage device 912. As the herein described methods and processes change the data held by the non-volatile storage device, and thus transform the state of the non-volatile storage device, the state of display subsystem 916 may likewise be transformed to visually represent changes in the underlying data. Display subsystem 916 may include one or more display devices utilizing virtually any type of technology. Such display devices may be combined with logic processor 904, volatile memory 908, and/or non-volatile storage device 912 in a shared enclosure, or such display devices may be peripheral display devices.

When included, input subsystem 920 may comprise or interface with the one or more user-input devices such as a keyboard, mouse, touch screen, electronic pen, stylus, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 924 may be configured to communicatively couple various computing devices described herein with each other, and with other devices. Communication subsystem 924 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a method for determining a distance of an input device from a surface of a computing device, the method comprising: receiving a plurality of input device signals via the input device; using a portion of the input device signals to determine an effective voltage of the input device; generating adjusted input device signals by adjusting another portion of the input device signals using the effective voltage of the input device; providing the adjusted input device signals as an input to a distance model; receiving, from the distance model, the distance of the input device from the surface of the computing device; and outputting the distance of the input device from the surface of the computing device.

The method may additionally or alternatively include, wherein using the portion of the input device signals to determine the effective voltage of the input device comprises providing the portion of the input device signals to a voltage data model that calculates the effective voltage. The method may additionally or alternatively include, determining that the input device is contacting the surface of the computing device; and providing the portion of the input device signals to the voltage data model on condition of determining that the input device is contacting the surface of the computing device. The method may additionally or alternatively include, wherein determining that the input device is contacting the surface of the computing device comprises (a) receiving a pressure signal from a tip of the input device, or (b) determining that the input device is moving across the surface of the computing device.

The method may additionally or alternatively include, wherein generating the adjusted input device signals comprises dividing the another portion of the input device signals by the effective voltage of the input device. The method may additionally or alternatively include, wherein the plurality of input device signals comprise a tip signal from a tip transmitter of the input device and a body signal from a body transmitter of the input device that is spaced from the tip transmitter.

The method may additionally or alternatively include, wherein the effective voltage of the input device comprises a determined voltage of the input device divided by a voltage of a golden input device, wherein the golden input device is utilized to train a voltage data model that calculates the effective voltage. The method may additionally or alternatively include using the adjusted input device signals to train a neural network configured to determine the distance of the input device from the surface of the computing device. The method may additionally or alternatively include receiving the portion of the input device signals via the input device for at least a threshold period of time before generating the adjusted input device signals by adjusting the another portion of the input device signals.

Another aspect provides a computing device, comprising: a surface; a processor; and a memory storing instructions executable by the processor to: receive a plurality of input device signals via the input device; use a portion of the input device signals to determine an effective voltage of the input device; generate adjusted input device signals by adjusting another portion of the input device signals using the effective voltage of the input device; provide the adjusted input device signals as an input to a distance model; receive, from the distance model, the distance of the input device from the surface of the computing device; and output the distance of the input device from the surface of the computing device. The computing device may additionally or alternatively include, wherein using the portion of the input device signals to determine the effective voltage of the input device comprises providing the portion of the input device signals to a voltage data model that calculates the effective voltage. The computing device may additionally or alternatively include, wherein the instructions are further executable to: determine that the input device is contacting the surface of the computing device; and provide the portion of the input device signals to the voltage data model on condition of determining that the input device is contacting the surface of the computing device. The computing device may additionally or alternatively include, wherein determining that the input device is contacting the surface of the computing device comprises (a) receiving a pressure signal from a tip of the input device, or (b) determining that the input device is moving across the surface of the computing device.

The computing device may additionally or alternatively include, wherein generating the adjusted input device signals comprises dividing the input device signals by the effective voltage of the input device. The computing device may additionally or alternatively include, wherein the plurality of input device signals comprise a tip signal from a tip transmitter of the input device and a body signal from a body transmitter of the input device that is spaced from the tip transmitter.

The computing device may additionally or alternatively include, wherein the effective voltage of the input device comprises a determined voltage of the input device divided by a voltage of a golden input device, wherein the golden input device is utilized to train a voltage data model that calculates the effective voltage. The computing device may additionally or alternatively include, using the adjusted input device signals to train a neural network configured to determine the distance of the input device from the surface of the computing device. The computing device may additionally or alternatively include, receiving the portion of the input device signals via the input device for at least a threshold period of time before generating the adjusted input device signals by adjusting the another portion of the input device signals.

Another aspect provides, at a computing device comprising a surface, a method for determining a distance of an input device from the surface of the computing device, the method comprising: determining whether the input device is contacting the surface of the computing device; if the input device is contacting the surface of the computing device, then providing a portion of input device signals received via the input device to a voltage data model; using the voltage data model to calculate an average effective voltage of the input device by averaging effective voltages determined from the portion of input device signals; generating adjusted input device signals by adjusting another portion of input device signals received via the input device using the average effective voltage of the input device; providing the adjusted input device signals as an input to a distance model configured to determine the distance of the input device from the surface of the computing device; receiving, from the distance model, the distance of the input device from the surface of the computing device; and outputting the distance of the input device from the surface of the computing device. The method may additionally or alternatively include, wherein generating the adjusted input device signals comprises dividing the another portion of input device signals by the average effective voltage of the input device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for determining a distance of an input device from a surface of a computing device, the method comprising:
   receiving at the computing device a plurality of input device signals via the input device;
   providing a portion of the input device signals to a voltage data model to determine an effective voltage of the input device;
   generating adjusted input device signals by adjusting another portion of the input device signals using the effective voltage of the input device;
   providing the adjusted input device signals as an input to a distance model;
   receiving, from the distance model, the distance of the input device from the surface of the computing device; and
   outputting the distance of the input device from the surface of the computing device.

2. The method of claim 1, further comprising:
   determining that the input device is contacting the surface of the computing device; and
   providing the portion of the input device signals to the voltage data model on condition of determining that the input device is contacting the surface of the computing device.

3. The method of claim 2, wherein determining that the input device is contacting the surface of the computing device comprises (a) receiving a pressure signal from a tip of the input device, or (b) determining that the input device is moving across the surface of the computing device.

4. The method of claim 1, wherein generating the adjusted input device signals comprises dividing the another portion of the input device signals by the effective voltage of the input device.

5. The method of claim 1, wherein the plurality of input device signals comprise a tip signal from a tip transmitter of the input device and a body signal from a body transmitter of the input device that is spaced from the tip transmitter.

6. The method of claim 1, wherein the effective voltage of the input device comprises a determined voltage of the input device divided by a voltage of a golden input device, wherein the golden input device is an input device configured to provide a predetermined voltage for training the voltage data model that calculates the effective voltage.

7. The method of claim 1, further comprising using the adjusted input device signals to train a neural network configured to determine the distance of the input device from the surface of the computing device.

8. The method of claim 1, further comprising receiving at the computing device the portion of the input device signals via the input device for at least a threshold period of time before generating the adjusted input device signals by adjusting the another portion of the input device signals.

9. A computing device, comprising:
a surface;
a processor; and
a memory storing instructions executable by the processor to:
receive at the computing device a plurality of input device signals via the input device;
provide a portion of the input device signals to a voltage data model to determine an effective voltage of the input device;
generate adjusted input device signals by adjusting another portion of the input device signals using the effective voltage of the input device;
provide the adjusted input device signals as an input to a distance model;
receive, from the distance model, the distance of the input device from the surface of the computing device; and
output the distance of the input device from the surface of the computing device.

10. The computing device of claim 9, wherein the instructions are further executable to:
determine that the input device is contacting the surface of the computing device; and
provide the portion of the input device signals to the voltage data model on condition of determining that the input device is contacting the surface of the computing device.

11. The computing device of claim 10, wherein determining that the input device is contacting the surface of the computing device comprises (a) receiving a pressure signal from a tip of the input device, or (b) determining that the input device is moving across the surface of the computing device.

12. The computing device of claim 9, wherein generating the adjusted input device signals comprises dividing the input device signals by the effective voltage of the input device.

13. The computing device of claim 9, wherein the plurality of input device signals comprise a tip signal from a tip transmitter of the input device and a body signal from a body transmitter of the input device that is spaced from the tip transmitter.

14. The computing device of claim 9, wherein the effective voltage of the input device comprises a determined voltage of the input device divided by a voltage of a golden input device, wherein the golden input device is an input device configured to provide a predetermined voltage for training the voltage data model that calculates the effective voltage.

15. The computing device of claim 9, further comprising using the adjusted input device signals to train a neural network configured to determine the distance of the input device from the surface of the computing device.

16. The computing device of claim 9, further comprising receiving at the computing device the portion of the input device signals via the input device for at least a threshold period of time before generating the adjusted input device signals by adjusting the another portion of the input device signals.

17. At a computing device comprising a surface, a method for determining a distance of an input device from the surface of the computing device, the method comprising:
determining whether the input device is contacting the surface of the computing device;
if the input device is contacting the surface of the computing device, then providing a portion of input device signals received at the computing device via the input device to a voltage data model;
using the voltage data model to calculate an average effective voltage of the input device by averaging effective voltages determined from the portion of input device signals;
generating adjusted input device signals by adjusting another portion of input device signals received via the input device using the average effective voltage of the input device;
providing the adjusted input device signals as an input to a distance model configured to determine the distance of the input device from the surface of the computing device;
receiving, from the distance model, the distance of the input device from the surface of the computing device; and
outputting the distance of the input device from the surface of the computing device.

18. The method of claim 17, wherein generating the adjusted input device signals comprises dividing the another portion of input device signals by the average effective voltage of the input device.

* * * * *